United States Patent
Chua et al.

(10) Patent No.: US 10,519,356 B2
(45) Date of Patent: Dec. 31, 2019

(54) THERMALLY CONDUCTIVE POLYAMIDE COMPOUNDS CONTAINING LASER DIRECT STRUCTURING ADDITIVES

(71) Applicant: PolyOne Corporation, Avon Lake, OH (US)

(72) Inventors: Yang Choo Chua, Singapore (SG); Haiyan Chen, Singapore (SG)

(73) Assignee: PolyOne Corporation, Avon Lake, OH (US)

( * ) Notice: Subject to any disclaimer, the term of this patent is extended or adjusted under 35 U.S.C. 154(b) by 74 days.

(21) Appl. No.: 15/120,690

(22) PCT Filed: Feb. 24, 2015

(86) PCT No.: PCT/US2015/017309
§ 371 (c)(1),
(2) Date: Aug. 22, 2016

(87) PCT Pub. No.: WO2015/130676
PCT Pub. Date: Sep. 3, 2015

(65) Prior Publication Data
US 2017/0066954 A1    Mar. 9, 2017

Related U.S. Application Data

(60) Provisional application No. 61/944,151, filed on Feb. 25, 2014.

(51) Int. Cl.
| | | |
|---|---|---|
| C09K 5/14 | (2006.01) | |
| B29C 48/00 | (2019.01) | |
| C08K 3/38 | (2006.01) | |
| B33Y 70/00 | (2015.01) | |
| C08K 3/22 | (2006.01) | |
| B33Y 10/00 | (2015.01) | |
| B33Y 80/00 | (2015.01) | |
| B29C 43/00 | (2006.01) | |
| B29C 43/24 | (2006.01) | |
| B29C 45/00 | (2006.01) | |
| B29C 51/00 | (2006.01) | |
| C08K 13/04 | (2006.01) | |
| B29C 64/00 | (2017.01) | |
| B29K 77/00 | (2006.01) | |
| B29K 105/00 | (2006.01) | |

(52) U.S. Cl.
CPC .............. *C09K 5/14* (2013.01); *B29C 43/003* (2013.01); *B29C 43/24* (2013.01); *B29C 45/0001* (2013.01); *B29C 48/022* (2019.02); *B29C 51/002* (2013.01); *B29C 64/00* (2017.08); *B33Y 10/00* (2014.12); *B33Y 70/00* (2014.12); *B33Y 80/00* (2014.12); *C08K 3/22* (2013.01); *C08K 3/38* (2013.01); *C08K 13/04* (2013.01); *B29K 2077/00* (2013.01); *B29K 2105/0005* (2013.01); *B29K 2995/0013* (2013.01); *C08K 2003/385* (2013.01); *C08K 2201/001* (2013.01)

(58) Field of Classification Search
CPC .......... C09K 5/14; B33Y 10/00; B33Y 70/00; B33Y 80/00; B29C 43/00; B29C 43/24; B29C 45/0001; B29C 47/0004; B29C 51/002; B29C 67/0051; B29C 48/022; B29C 43/003; B29C 64/00; C08K 3/22; C08K 3/38; C08K 13/04; C08K 2003/385; C08K 2201/001; B29K 2077/00; B29K 2105/0005; B29K 2995/0013
See application file for complete search history.

(56) References Cited

U.S. PATENT DOCUMENTS

| | | |
|---|---|---|
| 6,428,189 B1 | 8/2002 | Hochstein |
| 7,902,283 B2 | 3/2011 | Avakian et al. |
| 8,309,640 B2 | 11/2012 | Li et al. |
| 8,827,508 B2 | 9/2014 | Sagal |
| 8,883,900 B2 | 11/2014 | Jiang et al. |
| 8,998,458 B2 | 4/2015 | Tankala et al. |
| 9,243,178 B2 | 1/2016 | Chen et al. |
| 2008/0153959 A1 | 6/2008 | Charati et al. |
| 2012/0134631 A1 | 5/2012 | Chiang et al. |
| 2012/0276390 A1 | 11/2012 | Ji et al. |
| 2013/0207029 A1 | 8/2013 | Janssen et al. |
| 2013/0289178 A1 | 10/2013 | Li et al. |
| 2014/0353543 A1 | 12/2014 | Wu et al. |
| 2016/0215124 A1 | 7/2016 | Takano et al. |
| 2017/0002193 A1 | 1/2017 | Cheng et al. |

FOREIGN PATENT DOCUMENTS

| | | | |
|---|---|---|---|
| CN | 102757640 | * 10/2012 | ............. C08L 77/00 |
| CN | 102775768 A | 11/2012 | |
| CN | 103450675 A | 12/2013 | |
| CN | 102796372 B | 6/2014 | |
| WO | 2015130676 A | 9/2015 | |

OTHER PUBLICATIONS

English machine translation of the specification of CN 102757640.*
English translation of the abstract of CN102757640.*
F. Ranft et al.: Laser Direct Structuring of Thermally Conductive Polymers: An Innovative Thermal Management Approach, Antec 2012, 5 pages.

* cited by examiner

*Primary Examiner* — Robert S Walters, Jr.
(74) *Attorney, Agent, or Firm* — John H. Hornickel; Emily E. Vlasek

(57) ABSTRACT

A thermally conductive polyamide compound is disclosed. The compound comprises a polyamide matrix, boron nitride, and a laser direct structuring additive dispersed in the matrix. The compound can be extruded, molded, calendered, thermoformed, or 3D-printed into a heat dissipating and laser direct structured article.

4 Claims, No Drawings

THERMALLY CONDUCTIVE POLYAMIDE COMPOUNDS CONTAINING LASER DIRECT STRUCTURING ADDITIVES

CLAIM OF PRIORITY

This application claims priority from U.S. Provisional Patent Application Ser. No. 61/944,151 and filed on Feb. 25, 2014, which is incorporated by reference.

FIELD OF THE INVENTION

This invention concerns thermoplastic polymer compounds which are thermally conductive and flame retardant.

BACKGROUND OF THE INVENTION

Any energized product in modern society is not ideally efficient. Therefore, the consumption of energy is accompanied by the emission of heat. Dissipation of heat from an energized product is a common industrial engineering consideration. Electronic products are particularly susceptible to excessive heat. Personal computers contain fans for keeping sensitive electronic parts at or near the ambient temperature by dissipating the heat by convection.

Thermally conductive polymer compounds also exist to dissipate heat by conduction. These compounds are formed into parts to serve as heat sinks, radiators, etc. and other items more traditionally made of metal. Often aluminum oxide, or more commonly called alumina, is used as an additive to a thermoplastic polymer matrix to serve as the vehicle for dissipation of heat. But alumina is a particularly abrasive material which can degrade the internal surfaces of manufacturing equipment such as compounding extruders.

U.S. Pat. No. 7,902,283 (Barber et al.) discloses thermally conductive polyamide compounds using zinc sulfide.

Polymeric articles can be prepared for use in electronic circuitry whereby integrated circuit traces via direct metallization can be made in the surfaces of the polymeric article of any shape, using a process called "laser direct structuring." According to Ranft, et al., "LASER DIRECT STRUCTURING OF THERMALLY CONDUCTIVE POLYMERS: AN INNOVATIVE THERMAL MANAGEMENT APPROACH" (ANTEC, 2012), the laser direct structuring process (LDS) is an established technology for creating via direct metallization integrated circuit traces on three-dimensional thermoplastic parts, the so-called Molded Interconnect Devices (3D-MIDs). Starting in the late 1990s, the LDS technology started with a few commercial products in automotive and telecommunication applications. Recently, the largest market for this technology is the fabrication of integrated cell phone antennas, mostly situated in Asian countries.

Ranft et al. also report that another fast growing market and an important economical factor in the field of lighting technology is the exploding number of applications based on high brightness light emitting diodes (LEDs). Especially the improvements in luminous efficacy connected with the urgent need for energy conservation led to their increasing utilization in traffic lights, landscape and automotive lighting, and other optoelectronic applications.

SUMMARY OF THE INVENTION

What the art needs is a thermally conductive polyamide compound which has thermal conductivity and an ability to undergo laser direct structuring to produce integrated circuit traces via direct metallization on the laser-activated portions on surfaces of polymer articles made from the compound.

The present invention has solved that problem by using the following functional additives with the polyamide resin: boron nitride as a thermally conductive filler and a laser direct structuring additive serving that purpose.

Thus, one aspect of the invention is a thermally conductive polymer compound, comprising polyamide, boron nitride, and a laser structuring additive, wherein the compound has an in-plane thermal conductivity of more than 2.5 W/mK as measured using ASTM E1461, a plating index greater than 0.7 as measured according to ASTM B568 (using Pocan 7102 at DOW Circuposit 4500 as a plating reference), and an adhesion strength greater than 0.7 N/mm as measured using IPC-TM-650.

Features of the invention will be explored below.

EMBODIMENTS OF THE INVENTION

Polyamide

Any polyamide is a candidate for use in the compound, whether obtained from petrochemical or bio-derived sources.

The most popular polyamide is polyamide 6 (also known as nylon 6). As the examples show below, polyamide 6 resin can be made thermally conductive to an extent greater than 2.5 W/mK as measured using ASTM E1461.

Non-limiting examples of other polyamides (PA) which are candidates to serve as the matrix for the compound of the present invention Suitable polyamide include both amorphous and semi-crystalline polyamides, aliphatic and aromatic polyamides. Examples of aliphatic polyamides, in addition to PA 6, include; PA 11; PA12; PA 4,6; PA 6,6; PA 10,10; PA 12,12; copolyamides; and combinations thereof. Examples of aromatic polyamides include PA 6I; PA 6T; PA 9T; PA10T; PA 6I/66; PA 6T/66; PA 6I/6T; copolyamides; and combinations thereof. Without undue experimentation, one of ordinary skill in the art can select a polyamide matrix based on considerations of cost, manufacturing technique, physical properties, chemical properties, etc.

Boron Nitride

Thermally conductive filler potentially useful for the compound is boron nitride, available commercially as cubic boron nitride or as hexagonal boron nitride. As is known in the art, hexagonal boron nitride provides a higher thermal conductivity than cubic boron nitride and therefore is preferred. Also hexagonal boron nitride assists in resulting high surface resistivity.

Laser Direct Structuring Additive

Any current additive used in the laser direct structuring process is a candidate for use in this invention. Typical materials useful in the laser direct structuring (LDS) process are usually spinel based metal oxides (such as copper chromium oxide), organic metal complexes (such as palladium/palladium-containing heavy metal complexes), copper complexes or a combination of the above. In addition, as reported in PCT Patent Publication WO2012056416, with an organic metal complex, higher loadings are needed to obtain sufficiently dense nucleation for rapid metallization when activated, and these higher amounts adversely affect the mechanical properties of the materials.

Examples of LDS additives considered useful in useful in PCT Patent Publication WO2012056416, and therefore candidates for use in this invention are metal oxides, metal oxide-coated fillers or a combination including at least one of the foregoing more conventional LDS additives identified in the prior paragraph. For example, LDS materials identified in PCT Patent Publication WO2012056416 is antimony doped tin oxide coating on a mica substrate, a coating including a copper containing metal oxide, a zinc containing metal oxide, a tin containing metal oxide, a magnesium containing metal oxide, an aluminum containing metal oxide, a gold containing metal oxide, a silver containing metal oxide, or a combination including at least one of the foregoing metal oxides, and the substrate may be any other mineral, such as silica. PCT Patent Publication WO2012056416 continues with identification of tin oxide, zinc containing metal oxide, a tin containing metal oxide, an aluminum containing metal oxide, or a combination including at least one of the foregoing metal oxides.

Presently preferred is a laser direct structuring material named "LDS-Additive" sold by LPKF Laser & Electronics AG of Osteriede 7, D-30827 Garbsen, Germany which maintains the LDS-Additive as a trade secret without identification of CAS No. or other indication of specific chemistry.

Optional Other Additives

The compound of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.wil-liamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders, such as talc and glass fiber; flame retardants; smoke suppresants; impact modifiers; initiators; lubricants; micas; pigments, colorants and dyes; plasticizers, such as core/shell impact modifiers; processing aids; release agents; silanes, titanates and zirconates; slip and anti-blocking agents; stabilizers; stearates; ultraviolet light absorbers; viscosity regulators; waxes; catalyst deactivators, and combinations of them.

Two of the optional additives are talc and glass fiber, the first principally serving as a filler and the second providing reinforcement. Also, LPKF Laser & Electronics AG, a company active in laser direct structuring technology reports that talc can also enhance plating performance during the LDS process.

Table 1 shows acceptable, desirable, and preferable ranges of ingredients useful in the present invention, all expressed in weight percent (wt. %) of the entire compound. The compound can comprise, consist essentially of, or consist of these ingredients. Any number between the ends of the ranges is also contemplated as an end of a range, such that all possible combinations are contemplated within the possibilities of Table 1 as candidate compounds for use in this invention.

TABLE 1

| Ingredient | Acceptable | Desirable | Preferable |
|---|---|---|---|
| Polyamide 6 resin | 20-65 | 30-60 | 40-50 |
| Hexagonal boron nitride | 10-40 | 15-35 | 20-30 |
| Talc | 0-40 | 15-35 | 20-30 |

TABLE 1-continued

| Ingredient | Acceptable | Desirable | Preferable |
|---|---|---|---|
| Laser direct structuring additive | 0.5-20 | 1-15 | 2-10 |
| Glass fiber reinforcing agent | 0-30 | 5-20 | 10-20 |
| Calcium stearate lubricant | 0-5 | 0.1-4 | 0.2-2 |
| Phenolic anti-oxidant | 0-0.6 | 0.05-0.5 | 0.1-0.4 |
| Tri-aryl phosphite processing stabilizer | 0-0.6 | 0.05-0.5 | 0.1-0.4 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Compounds of the present invention can dissipate heat quite efficiently, making them suitable for extruded, molded, calendered, thermoformed, or 3D-printed articles designed to contact a heated object and conduct that heat away from that object or contact a heated object and conduct that heat toward a second object that needs heat also. Either way, the compounds of the present invention can transport heat away from that source, whether to distribute to a remote location from that object (a radiator in a residential room) or to dissipate to a remote location from that object (a heat sink).

With the capability of laser direct structuring, the polymer article however formed can undergo laser direct processing to provide circuitry traces for the article to become part of electronic circuitry.

According to Ranft et al., the LDS-process is based on three steps. At first a laser beam (Nd:YAG) heats the polymer and the incorporated laser direct structuring additive particles followed by a localized ablation of the plastic surface. A transition metal complex applied on a ceramic core material is activated by the laser energy and metal nuclei are split from the metal-organic structure. Finally, on the exposed metal nuclei a copper metallization can be applied using a copper immersion bath without external power feed. In most cases the copper layer is supplemented with electroless nickel and a final immersion gold layer to avoid oxidative degradation One industry which needs management and dissipation of heat is the lighting industry, especially lighting produced by light emitting diodes (LEDs) as opposed to filamented electrical lamps. LEDs are sensitive in performance in the presence of temperature, as are the electronics nearby or contiguous to a lighted LED. Therefore, a preferred molded article is a LED housing or other electronic part. With the capability of laser direct structuring, the LED housing or other electronic part itself can have electronic circuitry formed on its surface(s).

The physical properties of the polymer matrix determine the suitability of the compound for specific polymer engineering purposes; the use of boron nitride imparts thermally conductivity where none or only a little thermal conductivity previously existed in the polymer matrix; and the laser direct structuring additive imparts the ability to form electronic circuitry on the polymeric article's surface(s).

The compounds can be used in several types of electronic circuitry applications within such devices as personal computers, tablet computers, smart phones, global positioning system devices, medical devices, RFID transmitters and receivers, and electronics generally in the health care, automotive, construction, aerospace, and other industries.

Examples provide data for evaluation.

EXAMPLES

Comparative Example A and Examples 1-3

Table 2 shows the list of ingredients. Table 3 shows the extrusion conditions. Table 4 shows the molding conditions. Table 5 shows the recipes.

Table 5 shows testing methods performed on two samples of Example and Comparative Example using ASTM procedures. Table 5 also uses a "Plating Index" and an "Adhesion Strength" tests on two samples of each Example.

The "Plating Index" test was performed by a standard laser activation and electroless copper plating process using Pocan 7102 (4.69 μm/45 min) @ DOW Circuposit 4500 as the plating reference. The laser power was varied from 3 to 8 W, laser pulse varied from 40 to 100 kHz and laser speed varied from 2 to 4 m/s. The thickness of the copper plating ranged from 3.5 to 4.5 μm.

The "Adhesion Strength" test was performed according to the standard test IPC-TM-650.

TABLE 2

| Brand Name | Ingredient and Purpose | Commercial Source |
| --- | --- | --- |
| YH402SD | Polyamide 6 resin | Yueyang Baling, China |
| HBN-Premium Grade | Hexagonal boron nitride thermal filler | Qingzhou Fangyuan, China |
| Talc | Talc mineral filler | Anlida Huashifen, China |
| LDS-Additive | Laser direct structuring additive | LPKF Laser & Electronics AG, Germany |
| ECS 301CL | Glass fiber reinforcing agent | Chongqing Polymer International, China |
| SAK-CS-P | Calcium stearate lubricant | Sun Ace Kakoh, Singapore |
| Irganox 1098 | Phenolic anti-oxidant | BASF, Germany |
| Irgafos 168 | Tri-aryl phosphite processing stabilizer | BASF, formerly Ciba, Switzerland |

TABLE 3

Extruder Conditions
All Comparative Examples and Examples

| | |
| --- | --- |
| Extruder Type | Twin screw extruder |
| Order of Addition | All ingredients mixed together and fed through main feeder, except the glass fiber which was added at Zone 7. |
| Zone 1 | 275° C. |
| Zone 2 | 275° C. |
| Zone 3 | 280° C. |
| Zone 4 | 280° C. |
| Zone 5 | 280° C. |
| Zone 6 | 280° C. |
| Zone 7 | 280° C. |
| Zone 8 | 280° C. |
| Zone 9 | 280° C. |
| Die | 280° C. |
| RPM | 210 |

TABLE 4

Molding Conditions
All Comparative Examples and Examples
JSW molding machine

| Drying Conditions before Molding: | |
| --- | --- |
| Temperature (° C.) | 80-90 |
| Time (h) | 2-4 hr |
| Temperatures: | |
| Nozzle (° C.) | 270 |
| Zone 1 (° C.) | 265 |
| Zone 2 (° C.) | 275 |
| Zone 3 (° C.) | 275 |
| Mold (° C.) | 80 |
| Oil Temp (° C.) | 40 |
| Speeds: | |
| Screw RPM (%) | 30-40 |
| % Shot - Inj Vel Stg 1 | 30 |
| % Shot - Inj Vel Stg 2 | 30 |
| % Shot - Inj Vel Stg 3 | 30 |
| % Shot - Inj Vel Stg 4 | 30 |
| % Shot - Inj Vel Stg 5 | 30 |
| Pressures: | |
| Hold Stg 1 (mPa) - Time (sec) | 50/100 |
| Hold Stg 2 (mPa) - Time (sec) | 50/100 |
| Timers: | |
| Injection Hold (sec) | 5 |
| Cooling Time (sec) | 20 |
| Operation Settings: | |
| Shot Size (mm) | 64 |
| Cushion (mm) | 4 |

TABLE 5

| | Example | | | Comp. Ex. A |
| --- | --- | --- | --- | --- |
| | Ex. 1 | Ex. 2 | Ex. 3 | |
| Recipes (Wt. %) | | | | |
| Polyamide 6 resin | 45.4 | 43.4 | 41.4 | 49.4 |
| Hexagonal boron nitride | 20 | 20 | 20 | 20 |
| Talc | 20 | 20 | 20 | 20 |
| "LDS-Additive" Laser direct structuring additive | 4 | 6 | 8 | — |

TABLE 5-continued

| | Example | | | |
|---|---|---|---|---|
| | Ex. 1 | Ex. 2 | Ex. 3 | Comp. Ex. A |
| Glass fiber reinforcing agent | 10 | 10 | 10 | 10 |
| Calcium stearate lubricant | 0.3 | 0.3 | 0.3 | 0.3 |
| Phenolic anti-oxidant | 0.15 | 0.15 | 0.15 | 0.15 |
| Tri-aryl phosphite processing stabilizer | 0.15 | 0.15 | 0.15 | 0.15 |
| Test Results | | | | |
| ASTM D638 Tensile Strength; Sample 1 (psi) | 12475 | 11989 | 12008 | 14092 |
| ASTM D638 Tensile Strength; Sample 2 (psi) | 12243 | 11837 | 12601 | 14139 |
| ASTM D790 Flexural Modulus; Sample 1 (ksi) | 1572 | 1778 | 1746 | 1477.2 |
| ASTM D790 Flexural Modulus; Sample 2 (ksi) | 1585 | 1737 | 1786 | 1488.2 |
| ASTM E1461 Thermal Conductivity In-plane; Sample 1 (W/mK) | 2.82 | 3.22 | 3.11 | 2.38 |
| Percentage Increase Over Comparative Example A | 18% | 35% | 31% | NA |
| ASTM E1461 Thermal Conductivity In-plane; Sample 2 (W/mK) | 2.77 | 3.20 | 3.02 | 2.36 |
| Percentage Increase Over Comparative Example A | 17% | 36% | 28% | NA |
| Plating Index; Sample 1 | 0.75 | 0.92 | 0.93 | Not tested |
| Plating Index; Sample 2 | 0.81 | 0.81 | 0.88 | Not tested |
| Adhesion Strength; Sample 1 (N/mm) | 1.58 | 1.15 | 1.69 | Not tested |
| Adhesion Strength; Sample 2 (N/mm) | 1.64 | 1.21 | 1.26 | Not tested |

The data of the Results showed that all compositions of Examples 1 to 3 exhibited the ability to be laser direct structured, as evidenced by a Plating Index >0.7 and an Adhesion Strength >0.7 N/mm.

Also, Examples 1 to 3 all exhibited in-plane thermal conductivities of more than 2.5 W/mK, acceptable for use as a molded article for thermal management in electronic products.

The Laser Direct Structure additives content in the compound unexpectedly and synergistically increased the thermal conductivity of the compound. A comparison between Comparative Example A and each of Examples 1-3 showed that presence of the LDS additives also increased the in-plane thermal conductivity by 17 to 36%. In other words, laser direct structuring additive not only serves to create circuitry traces as Ranft et al. describe but also enhances thermal conductivity.

But Ranft et al. report, "According to expectations, the incorporation of 8 wt. % LDS additive doesn't increase the thermal conductivity significantly compared to the unmodified polymer." Unexpectedly, comparing Comparative Example A and Examples 1-3, the percentage increase of 17-36% in thermal conductivity direct contradicts the expectations of Ranft et al. that the laser direct structuring additive does not contribute thermal conductivity properties to a polymer which contains such additive.

Moreover, the 50 weight percent of boron nitride reported by Ranft et al. is 2.5 times the weight percent of boron nitride in Examples 1-3. The use of inert talc filler in an amount of 20 weight percent obviates the need for either polyamide resin or expensive boron nitride.

The progression of laser direct structuring additive from 4 to 6 to 8 weight percent in Examples 1-3, respectively, showed non-linear progression of Plating Index and Adhesion Strength, demonstrating that the experimental results were unpredictable. A relatively high level of Adhesion Strength is observed even at the lower limit of LDS additive addition (4 weight percent in Example 1). From other experiments, it is known that, at such low levels of LDS additive addition, the Adhesion Strength typically does not exceed 1 N/mm. The result for Example 1 suggests that the thermal conductive additives could have a synergistic effect in enhancing the laser direct structuring performance of the compound.

The invention is not limited to the above embodiments. The claims follow.

What is claimed is:

1. A thermally conductive polymer compound, comprising:
   (a) from about 40 to about 50 weight percent of the polymer compound of polyamide 6,
   (b) from about 20 to about 30 weight percent of hexagonal boron nitride,
   (c) from about 20 to about 30 weight percent of talc,
   (d) from about 2 to about 10 weight percent of a laser direct structuring additive,
   (e) from about 7 to about 20 weight percent of glass fiber reinforcing agent,
   (f) from about 0.2 to about 2 weight percent of calcium stearate lubricant,
   (g) from about 0.1 to about 0.4 weight percent of phenolic anti-oxidant, and
   (h) from about 0.1 to about 0.4 tri-aryl phosphite processing stabilizer,
   wherein the compound has an in-plane thermal conductivity of more than 2.5 W/mK as measured using ASTM E1461, a plating index greater than 0.7 as measured according to ASTM B568 (using Pocan 7102 at DOW Circuposit 4500 as a plating reference), and an adhesion strength greater than 0.7 N/mm as measured using IPC-TM-650.

2. The compound of claim 1, wherein the laser direct structuring additive is selected from the group consisting of spinel based metal oxides, organic metal complexes, copper complexes, metal oxides, metal oxide-coated fillers or a combination of them.

3. The compound of claim 1, further comprising an additive selected from the group consisting of adhesion promoters; biocides; anti-fogging agents; anti-static agents; bonding, blowing and foaming agents; dispersants; fillers and extenders; flame retardants; glass fibers; smoke suppressants; impact modifiers; initiators; micas; pigments, colorants and dyes; plasticizers; release agents; silanes, titanates and zirconates; slip and anti-blocking agents; ultraviolet light absorbers; viscosity regulators; waxes; catalyst deactivators, and combinations of them.

4. The compound of claim 1, wherein the hexagonal boron nitride comprises about 20 weight percent of the compound.

* * * * *